United States Patent [19]

Tanaka

[11] Patent Number: 5,229,146
[45] Date of Patent: Jul. 20, 1993

[54] FISH FEED ADDITIVE AND PROCESS FOR PRODUCING THE SAME

[76] Inventor: Yoshio Tanaka, 22 Banchi, Yamaguchi-cho, Gifu-shi, Gifu-ken, Japan

[21] Appl. No.: 796,968

[22] Filed: Nov. 25, 1991

[30] Foreign Application Priority Data

Mar. 8, 1991 [JP] Japan ................... 3-067677

[51] Int. Cl.$^5$ ............................... A23K 1/00
[52] U.S. Cl. ........................... 426/1; 426/72; 426/454; 426/518; 426/643; 426/805
[58] Field of Search .......... 426/1, 72, 74, 656, 426/805, 454, 518, 643

[56] References Cited

U.S. PATENT DOCUMENTS 4,210,634  7/1980  Jaeger .................. 426/656
4,913,915  4/1990  Tanaka .................. 426/72

Primary Examiner—R. B. Penland

[57] ABSTRACT

A fish feed additive is used which contains $\beta$-carotene containing Dunaliella algae powder stabilized against oxidation and migration into the water. The fish feed is prepared by mixing 100 parts by weight of a Dunaliella algae powder with 15–50 parts by weight of a cyclodextrin while stirring. The final fish feed is obtained by blending 10 parts by weight of this additive with 200–500 parts by weight of a common fish feed. The fish feed additive is in the form of dry fine granules. The fish feed additive effectively promotes growth and delivers $\beta$-carotene to the fish.

3 Claims, No Drawings

FISH FEED ADDITIVE AND PROCESS FOR PRODUCING THE SAME

TECHNICAL FIELD

This invention relates to a fish feed additive which is produced from a Dunaliella alga powder containing a large amount of β-carotene and cyclodextrin, a fish feed containing said additive and processes for producing them.

BACKGROUND OF THE INVENTION

There have been known a feed containing Chlorella algae (green algae) for improving the red body color of prawn (refer to Japanese Patent Laid-Open No. 131894/1974), a feed additive comprising Spirulina algae (blue-green algae) (refer to Japanese Patent Publication No. 10017/1981) and a feed composition for prawn comprising Dunaliella algae (green algae) as the active component. These products have been used in order to improve the body color of prawn.

SUMMARY OF THE INVENTION

The present inventors have conducted studies on feeds or feed additives comprising Dunaliella algae, wherein a dry alga powder or water-washed algae are not merely used as a prawn feed for improving the body color or said additive is never blended with a prawn feed but β-carotene contained in Dunaliella algae, which is unstable and easily oxidized, is stably sustained in a feed additive for promoting the growth of fishes, as well as processes for producing the same, thus completing the present invention.

The present invention provides a fish feed additive in the form of fine granules which is produced by mixing 100 parts by weight of a Dunaliella alga powder with 15 to 50 parts by weight of cyclodextrin, optionally adding an appropriate amount of water, mixing the resulting mixture under stirring, drying and grinding the mixed adsorbate thus obtained, and comprises fine granules containing 100 parts by weight of the Dunaliella alga powder and 15 to 50 parts by weight of cyclodextrin, as well as a process for producing the same.

The present invention further provides a fish feed, which is produced by blending 10 parts by weight of the above mentioned fish feed additive in the form of fine granules with 200 to 500 parts by weight of a common fish feed and comprises 200 to 500 parts by weight of the fish feed and 10 parts by weight of the Dunaliella alga powder, as well as a process for producing the same.

DETAILED DESCRIPTION OF THE INVENTION

In the present invention, the Dunaliella alga powder is adsorbed by cyclodextrin in order to stably sustain oily β-carotene contained in the Dunaliella algae, which is easily oxidized and unstable, in a fish feed additive or a fish feed comprising Dunaliella algae or during the production of the same.

In the present invention, 15 to 50 parts by weight of cyclodextrin is used per 100 parts by weight of the Dunaliella alga powder. This is because no adsorption is observed by using 15 parts by weight of less of cyclodextrin while the adsorption effect is never improved any more by using more than 50 parts by weight of the cyclodextrin, which is disadvantageous from an economical viewpoint.

In the present invention, 10 parts by weight of the fish feed additive of the present invention is blended with 200 to 500 parts by weight of a common fish feed. This is because the effect of the additive is never improved any more when less than 200 parts by weight of the fish feed is used, though the relative ratio of the additive is increased in this case, which is disadvantageous from an economical viewpoint. When more than 500 parts by weight of the fish feed is used, on the other hand, the effect of the additive is scarcely achieved.

In the present invention, the Dunaliella alga powder and cyclodextrin are formulated into a mixed adsorbate. Thus each particle of the Dunaliella alga powder, which is larger than the pore of the cyclodextrin, can be enclosed in said pore and therefore β-carotene can be more stably protected. Thus β-carotene can be stably sustained during the preservation of the fish feed additive or the fish feed of the present invention or during the production process of the fish feed.

Further, the fish feed additive of the present invention, which is in the form of fine granules, can be easily blended with a common powdery/granular fish feed so as to give a uniform composite feed. Alternately, said blend may be kneaded together with an appropriate amount of water and then molded into pellets or these pellets may be ground to thereby give crumbles.

It is sometimes observed that oily β-carotene in a Dunaliella alga powder is liberated from the algae in water and thus forms an oily film. In the case of the fish feed additive of the present invention, however, the Dunaliella alga powder is contained in the form of a mixed adsorbate together with cyclodextrin and thus the liberation of β-carotene from the algae can be prevented. When the fish feed additive of the present invention is blended with a common powdery fish feed and given to fishes as a powdery feed, therefore, β-carotene would never migrate into the water and thus the fishes can be efficiently fed.

The common fish feed to be used in the present invention involves a powdery or granular type for fresh water fishes such as carp, sweet fish and trout and salt-water fishes such as flatfish, young yellowtail, parrot fish and red sea bream. The Dunaliella algae to be used in the present invention involve, for example, *Dunaliella bardawil* and *Dunaliella salina*. As the cyclodextrin (simply referred to as CD), on the other hand, α-CD, β-CD, γ-CD, δ-CD, ε-CD, polymer CD and CD sugars may be used.

EXAMPLE

To 100 parts by weight of a *Dunaliella bardawil* alga powder, 20 parts by weight of β-cyclodextrin was added and stirred. After drying, a cyclodextrin-adsorbed fish feed additive in the form of fine granules was obtained.

Ten parts by weight of the adsorbed fish feed additive thus obtained was blended with 300 parts by weight of a common feed for adult carp in the form of fine granules and an appropriate amount of water and kneaded to thereby give a kneaded product.

The kneaded product was granulated with an extruder and dried. Thus an artificial carp feed containing Dunaliella alga powder in the form of pellets was obtained.

Three adult carp were fed with the artificial carp feed containing Dunaliella alga powder obtained above (test lot), while three other adult carp were fed with a common artificial carp feed (control lot). The following table shows the results of the feeding test continued for four months.

|  | Body length | Body weight |
| --- | --- | --- |
| Control lot | 1.31 ± 0.019 | 2.31 ± 0.051 |
| Test lot | 1.45 ± 0.079 | 3.10 ± 0.034 |

Although the body length of the test lot exceeded that of the control lot, no statistically significant difference was observed. The body weight of the test lot was significantly increased.

EFFECTS OF THE INVENTION

According to the present invention, a fish feed additive in the form of fine granules, wherein $\beta$-carotene contained in Dunaliella algae is stably sustained, can be obtained. This additive can be easily blended with a common fish feed so as to exert an excellent effect of promoting the growth of fishes.

What is claimed is:

1. A powdery or solid fish feed comprising 10 parts of a fish feed additive consisting essentially of 100 parts by weight of a Dunaliella alga powder and 15 to 50 parts by weight of a cyclodextrin, and 200 to 500 parts by weight of an conventional fish feed.

2. A process for producing a fish feed additive which comprises mixing 100 parts by weight of a Dunaliella alga powder with 15 to 50 parts by weight of a cyclodextrin while stirring to give a mixture, drying the mixture and grinding the dried mixture to give fine granules.

3. A process for producing a fish feed which comprises mixing 100 parts by weight of a Dunaliella alga powder with 15 to 50 parts by weight of a cyclodextrin while stirring to give a mixture, drying the mixture, grinding the dried mixture to give fine granules, blending 10 parts by weight of the fine granules with 200 to 500 parts by weight of an conventional fish feed in particulate form, adding water to give a mixture, kneading the mixture to give a kneaded mixture, granulating the kneaded mixture with an extruder to give pellets and drying the pellets.

* * * * *